Figure 8:
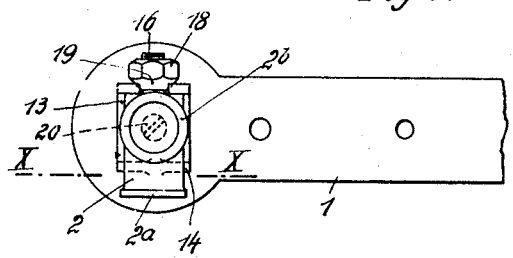

Dec. 15, 1931.  A. LUTZ  1,836,481
PLATE FOR SUPPORTING GAS METERS
Filed April 10, 1930   2 Sheets-Sheet 1
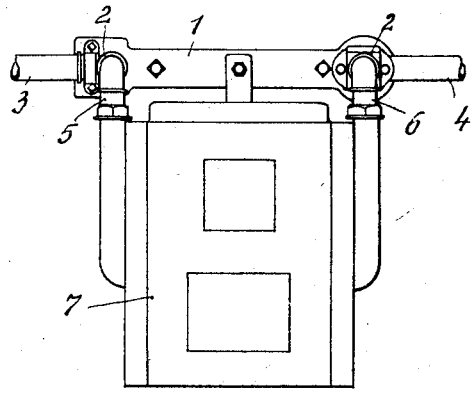
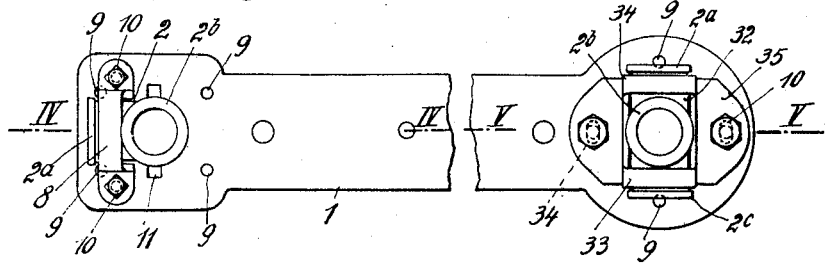
Inventor:
Anton Lutz
by Karldenbaum
Atty.

Dec. 15, 1931.  A. LUTZ  1,836,481
PLATE FOR SUPPORTING GAS METERS
Filed April 10, 1930  2 Sheets-Sheet 2

*Inventor:*
*Anton Lutz*
*by Hartterbach*
*Atty.*

Patented Dec. 15, 1931

1,836,481

UNITED STATES PATENT OFFICE

ANTON LUTZ, OF STUTTGART, GERMANY

PLATE FOR SUPPORTING GAS METERS

Application filed April 10, 1930, Serial No. 443,113, and in Germany December 21, 1929.

My invention relates to plates for supporting gas meters of the kind described in my copending application for patent of the United States, Serial No. 291,156, in which I have described a plate with a fitting which is adapted to be adjusted by turning it about an axis transversely with respect to the plate, in combination with means for connecting the fitting with the gas meter at one end and with a pipe of a gas main at the other end.

In the device thus described the axis about which each fitting is turned, coincides with the axis of the pipe on the meter, to which the fitting is connected. Variations in the position of the pipes of the gas main through which gas is supplied to and conducted away from the meter, are considered by turning the fittings about this axis.

A device of this kind is not as adaptable as required under certain conditions, for it can be fitted to a meter only if the ends of the meter connections are in the axis, about which the fitting is turned.

It is an object of my invention to increase the adaptability of a device of the kind described. To this end I so arrange the fitting with respect to the plate, that it is adapted to turn about an axis extending in parallel relation with respect to the plate, in addition to turning about the axis which extends transversely with respect to the plate.

In a preferred embodiment of my invention I arrange the support or bearing in which the fitting is mounted for rotation about the parallel axis, outside of the part of the fitting which is mounted to rotate about the transverse axis. The support or bearing might be arranged with its central plane in the transverse axis, but this would be inconvenient as the bearing could not be co-axial with the parallel axis and therefore the distance of the end of the fitting, which is connected with the meter, from the plate would be inconveniently long. Therefore, in the preferred embodiment aforesaid, I arrange the bearing for the parallel axis altogether outside of the part which turns about the transverse axis. The bearing may be designed as a one-sided bearing or clip, or it may be subdivided into two bearings, one on either side of the transverse axis.

In the drawings affixed to this specification and forming part thereof a device embodying my invention is illustrated diagrammatically by way of example.

In the drawings

Figure 9:
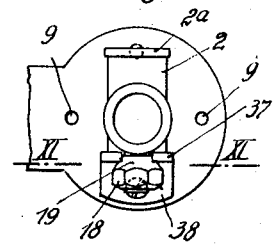
Figure 10:
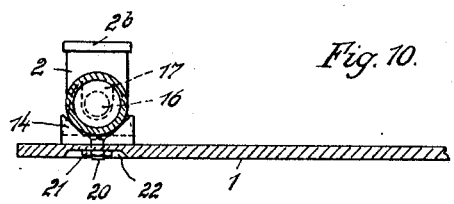
Figure 11:
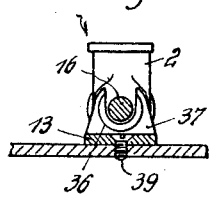
Figure 12:
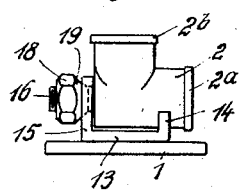
Figure 13:
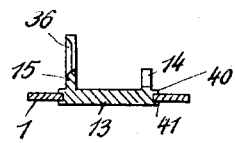

Fig. 1 is an elevation of a plate according to my invention showing the connections of the gas main and the meter, Fig. 2 is an elevation of an L-shaped fitting equipped with a one-sided bearing, Fig. 3 is an elevation of a T-shaped fitting equipped with a bearing at either side of the transverse axis, Figs. 4 and 5 are sections on the respective lines in Fig. 2, Fig. 6 is an elevation showing one end of the plate, Fig. 7 is an elevation of the fitting illustrated in Fig. 4, viewed from the right, Fig. 8 is an elevation of an L-shaped fitting equipped with a pivotal bearing bracket and a bearing at either side of the transverse axis, Fig. 9 is an elevation of a pivotal bracket with a bearing at one side of the transverse axis only, Figs. 10 and 11 are sections on the respective lines in Figs. 8 and 9, Fig. 12 is an elevation of the fitting and bracket illustrated in Fig. 10, and Fig. 13 is a section of a modified bracket.

Referring now to the drawings and first to Figs. 1, 2, and 4, 1 is the plate which may be secured to a wall by screws 1'; 2, 2 are fittings on the plate, 3 is a supply pipe which is attached to the end 2a of the fitting 2 at the left, 4 is a discharge pipe which is attached to the end 2a of the fitting 2 at the right, and 5 and 6 are the corresponding connections for the end 2b of each fitting to the meter 7. The meter may be supported by the fittings or may have a support of its own so that the fittings are relieved from its weight.

Referring now to Figs. 2 and 4, 8 is a bearing or clip in which the fitting 2 is turned about the parallel axis, and 10, 10 are screws at the ends of the bearing which are adapted to be threaded into a plurality of holes 9 in the plate 1, as shown in Fig. 6, so that the fitting may be fixed in three distinct positions about, or in parallel relation with respect to, its transverse axis. Preferably a rib 11 is formed on the fitting and adapted to engage notches 12 in the plate 1.

Referring to Fig. 3 the fitting 32 is T-shaped and the clip or bearing 8 is duplicated for the reception of the horizontal ends of the T, with its two ends 2a and 2c, the bearings 33 and 34 for the ends being formed on a bracket 35 which is secured to the plate 1 by the screws 10 as described with reference to Fig. 2. The holes 34 for the screws 10 in the bracket 35 are preferably elongated so as to provide further adjusting facilities. 11 is the rib which has already been described.

Referring now to Figs. 8–13, these illustrate bearings which are pivotally connected with the plate 1.

The type of bearing illustrated in Figs. 8, 10, 12, and 13 is constituted by a substantially U-shaped bracket 13 with vertical flanges 14 and 15. The flange 14 is open at the top and may be provided with inclined sides in the shape of a V for the reception of the part of the fitting 2 which extends in parallel relation with the plate 1. At the bend of the fitting 2 an axial threaded pin 16 is secured which is supported in an open eye of the flange 15, the opening 17, however, being only slightly larger than the diameter of the pin 16. The nut 18 on the pin 16 has a tapered inner end 19 which engages a corresponding seat 36 in the upright 15. The seat which may also be cylindrical, with a corresponding part at the nut 18 for engaging it, is of larger diameter than the width of the opening 17 so that the nut is retained by the edges of the upright 15 at the inner faces of the opening 17, as best seen in Fig. 8.

The pivot 20, Figs. 8 and 10, may be a screw and may be secured by a nut 21 in a recess 22 of the plate 1, Fig. 10.

Referring now to Figs. 9 and 11, the bearing illustrated is without the upright 14 and only equipped with an upright 37 for the reception of the pin 16 and a nut 18, as described, and a horizontal flange 38 extending outwardly from the upright 37 which is held on the plate 1 by a screw 39 in any one of the holes 9 of the plate 1. In this modification the fitting 2 is only supported by the pin 16 and may be adjusted by turning its flange 38 about the screw 39, or the position of its pivoted point may be varied by inserting the screw into another hole 9.

Obviously, holes may also be provided in various positions for the reception of the pivot 20 in Figs. 8 and 10.

Referring now to Fig. 13, this bearing consists of a bracket 13 which may be equipped with the two uprights 14 and 15, or with a single upright 37 only, like the bearing in Figs. 9 and 11, but is without a separate pivot, the body of the bracket being itself the pivot and provided with flanges 40 and 41. The bracket on which the flange 41 has not yet been formed, is inserted in a bore of the plate 1 and riveted over at the edge opposite the flange 40 so that it is held against axial displacement.

As compared with the bearings illustrated in Figs. 8–12 the bearing illustrated in Fig. 13 is low as its body is inserted in the plate 1.

The gist of my invention is that the fittings with the means for securing them to the plate 1, should be as small as practicable, which, as explained, is due to the fact that the bearing in which the fitting turns about the parallel axis is not arranged in line with the transverse axis but at one side of the transverse axis as shown in Figs. 2, 4, 9, and 11 or divided and arranged at either side of the axis, as shown in Figs. 3, 8, 10, 12, and 13.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A support for a gas meter comprising a plate, a pair of fittings, means for detachably securing the fittings to said plate so that each fitting is adapted to be turned about an axis extending transversely with respect to said plate, and a bearing on said plate for each fitting in which the fitting is supported to turn about an axis extending in parallel relation to said plate.

2. A support for a gas meter comprising a plate, a pair of fittings, means for detachably securing the fittings to said plate so that each fitting is adapted to be turned about an axis extending transversely with respect to said plate, and a bearing on said plate for each fitting in which the fitting is supported to turn about an axis extending in parallel relation to said plate, said last-mentioned bearings being arranged outside said transverse axis.

3. A support for a gas meter comprising a plate, two brackets mounted on said plate to rotate about axes extending transversely with respect to said plate, a bearing on each bracket with its axis extending in parallel relation to said plate, and a fitting pivotally mounted in each bearing.

4. A support for a gas meter comprising a plate, two brackets mounted on said plate to rotate about axes extending transversely with respect to said plate, a bearing on each bracket with its axis extending in parallel relation to said plate, a fitting pivotally mounted in each bearing, and means on said bearings for securing the corresponding fitting against rotation.

5. A support for a gas meter comprising a plate, a pair of fittings, means for detachably securing the fittings to said plate so that each fitting is adapted to be turned about an axis extending transversely with respect to said plate, a bearing on said plate for each fitting in which the fitting is supported to turn about an axis extending in parallel relation to said plate, and a projection on each fitting adapted to engage a recess in said plate.

In testimony whereof I affix my signature.

ANTON LUTZ.